July 3, 1945.  R. C. ASH  2,379,779
STUMP-JUMP MECHANISM FOR AGRICULTURAL IMPLEMENTS
Filed Sept. 23, 1943  3 Sheets-Sheet 1
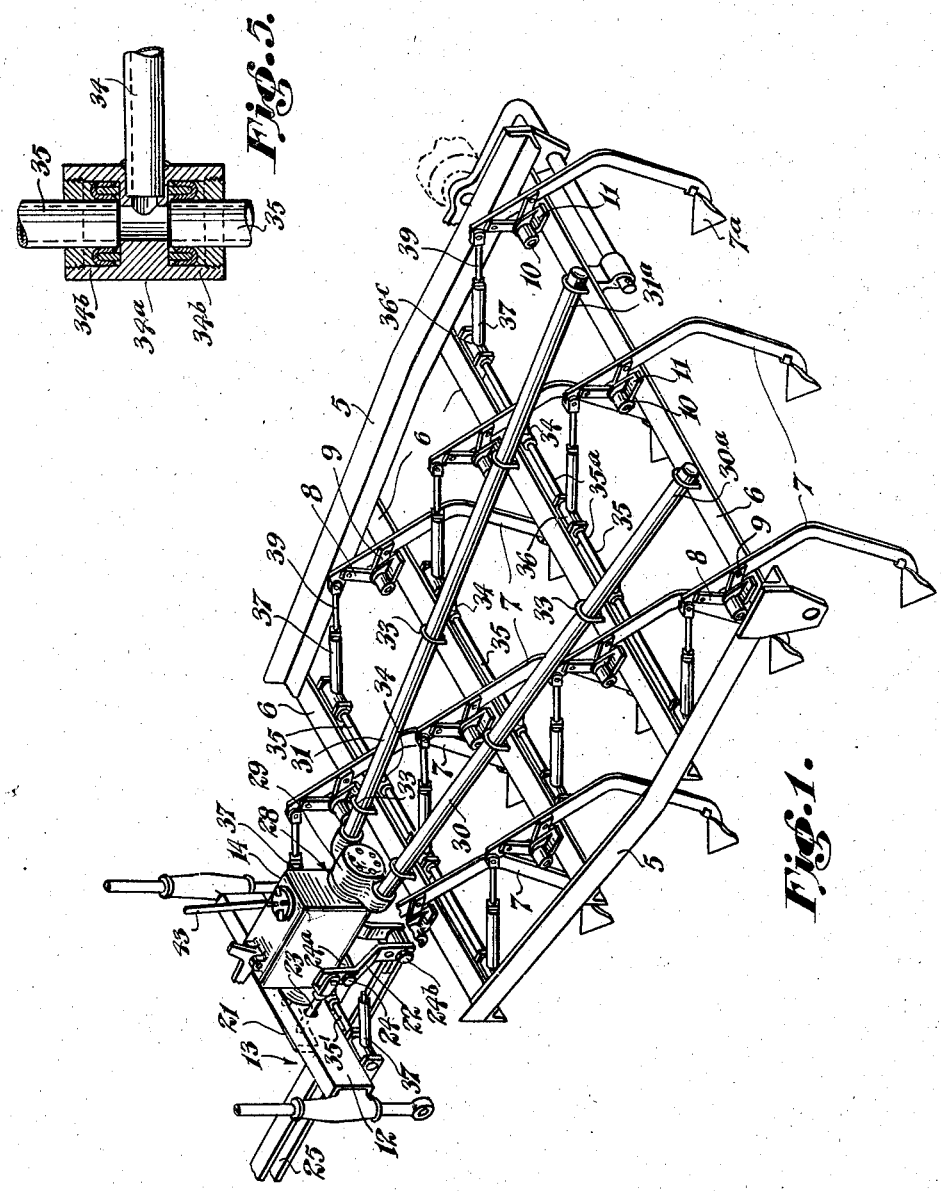
Inventor:
Roy Cecil Ash.
By Paul O Pippel
Atty.

July 3, 1945.  R. C. ASH  2,379,779
STUMP-JUMP MECHANISM FOR AGRICULTURAL IMPLEMENTS
Filed Sept. 23, 1943  3 Sheets-Sheet 2
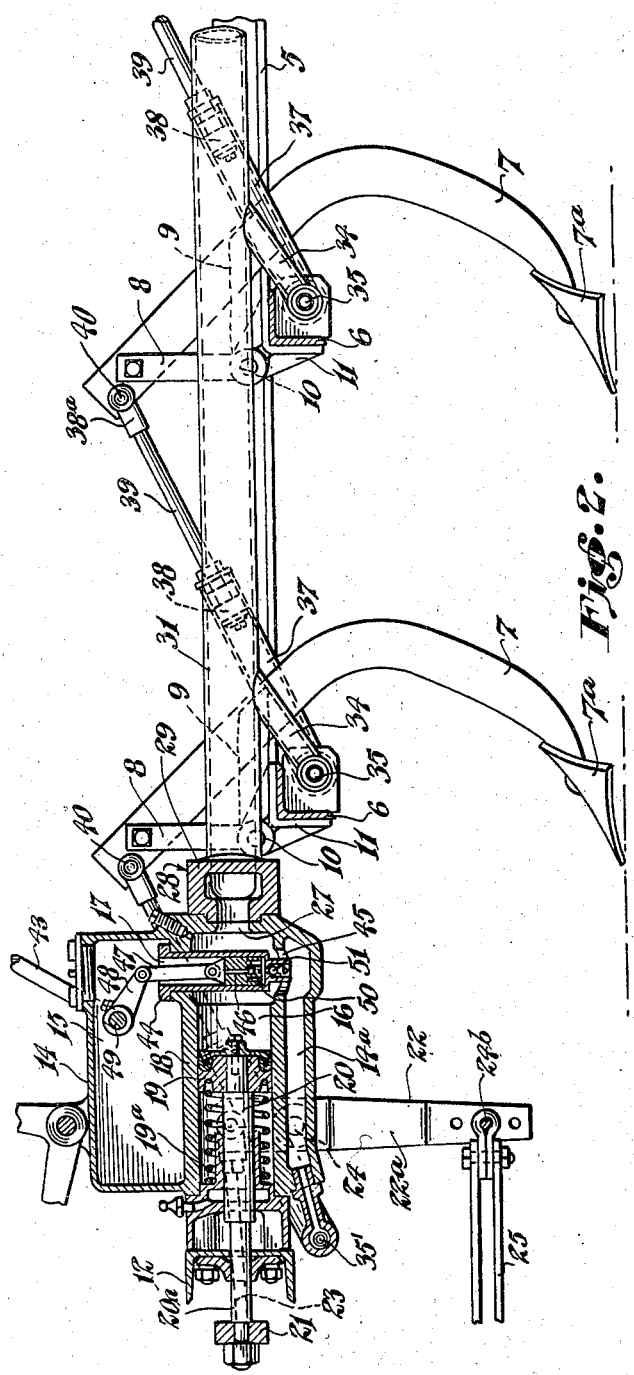
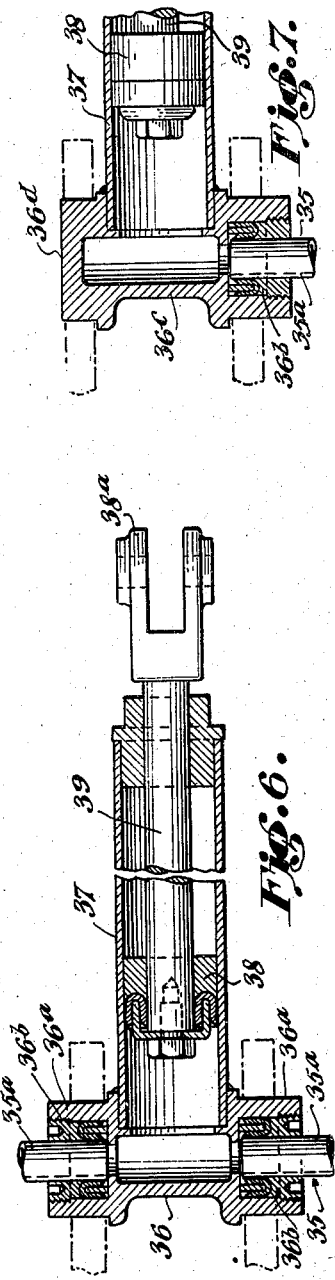
Inventor:
Roy Cecil Ash.
By Paul O. Pippel
Atty.

July 3, 1945.　　　　R. C. ASH　　　　2,379,779
STUMP-JUMP MECHANISM FOR AGRICULTURAL IMPLEMENTS
Filed Sept. 23, 1943　　　3 Sheets—Sheet 3

Inventor:
Roy Cecil Ash.
By Paus Pippel Atty.

Patented July 3, 1945

2,379,779

UNITED STATES PATENT OFFICE 2,379,779

STUMP-JUMP MECHANISM FOR AGRICULTURAL IMPLEMENTS

Roy Cecil Ash, Newtown, Geelong, Victoria, Australia, assignor to International Harvester Company, a corporation of New Jersey Application September 23, 1943, Serial No. 503,479
In Australia October 22, 1942

14 Claims. (Cl. 97—183)

This invention relates to agricultural implements of the type provided with stump-jump cultivating tools, i. e. earth working tools mounted for movement relatively to the main frame of the implement and to the ground, to clear obstacles in stump or stone infested ground. Such mechanism is necessary to prevent damage to the tools by permitting the tool to rise out of the ground when overloaded by encountering an obstruction.

Many and varied forms of stump-jump mechanism for cultivating tools have been devised and controlled by either spring or draft pressure applied in a direction to normally maintain said tools in ground engagement.

The inherent disadvantages of each of the above arrangements are well known, for instance the draft pressure is usually applied through bridle draft connections to the cultivating tools, necessitating the employment of numerous flexible draft rods or connections encumbering the implement, and likely to become jammed or entangled during obstacle clearing movements by the cultivating tools. Furthermore, the multiplicity of bridle draft connections, due to their intricate construction and arrangement are costly to manufacture, readily wear at the numerous interengaging positions and resultantly require frequent maintenance operations.

Spring controlled cultivating tools require separate or collective adjustment for tensioning the springs to accord with soil characteristics, involving considerable labour by the operator, while ineffective adjustment usually causes uneven depth of cut by the cultivating tools.

It is the principal object of this invention to provide a simple, economically constructed and effective stump-jump mechanism for a cultivating tool, (or group of the latter) whereby the conventional mechanical stump-jump fittings are dispensed with and the number of parts, connecting the cultivating tool are reduced to a minimum and arranged to eliminate the use of such connections below the main frame of the implement.

A further object of the invention is to provide mechanism for the purpose stated through which the cultivating tool is permitted to freely rise the height required in clearing an obstacle, with the return or ground-engaging movement of said tool controlled to prevent shock impact and strain upon the frame of the implement.

A further object of this invention is to provide a stump-jump mechanism in which the above stated reduction of the number of mechanical parts and connections associated with the cultivating tool, contributes to the substantial elimination of wear in the mechanism with consequent economy in maintenance and labour costs.

With the above stated objects in view, stump-jump mechanism for a cultivating tool according to this invention consists of a pressure liquid system responsive to draft pressure and so constructed and arranged that pressure is transmitted by and through said system to the cultivating tool so as to normally maintain said tool in ground engagement, without preventing an obstacle clearing movement by the cultivating tool.

During stump-jump or obstacle clearing movements by the cultivating tool the applied pressure upon the latter is temporarily overcome to permit the extent of movement required by said tool to clear the obstacle.

In a preferred practical embodiment of the invention, the pressure liquid system comprises a master pressure liquid cylinder with a piston axially movable under a draft pressure to transmit the said pressure by the displacement of liquid medium to a subsidiary cylinder having a piston coupled to the cultivating tool.

Whilst the draft pressure maintains the pressure on the piston in the master cylinder, the cultivating tool is maintained in ground engagement.

Upon the cultivating tool striking an obstacle in the ground, the resistance set up by the obstacle to the draft of the cultivating tool causes the latter to exert a force opposed to the applied draft pressure in the cultivating tool so as to overcome that pressure.

The cultivating tool is then free to rise and describe the movement necessary to clear the obstacle, said movement effecting retraction of the piston in the subsidiary cylinder against the pressure liquid. Retraction of the piston effects a displacement of pressure fluid in a reverse direction to overcome the pressure in the master cylinder, causing displacement of the piston in the latter cylinder, thereby compensating for and permitting the required movement of said tool to clear the obstacle.

The preferred practical arrangement of the stump-jump mechanism for cultivating tool is illustrated in the accompanying drawings, as applied to the cultivating tools of a scarifier.

In these drawings:

Fig. 1 is a perspective view of a scarifier frame supporting pivotally mounted cultivating tools for stump-jump movements under the control of the stump-jump mechanism, parts of the implement deemed unessential to the description of the invention being omitted.

Fig. 2 is a detail vertical central section of the master cylinder and illustrating the coupling of the master piston with the draft members, and the liquid distributor pipes connecting the subsidiary cylinders with the master cylinder.

Fig. 5 is a detail sectional view of a gland for coupling the distributor pipe to the feed pipes.

Fig. 6 is a detail sectional plan view illustrating the subsidiary cylinder and piston for coupling with the cultivating tool.

Fig. 7 is a detail sectional view of the gland coupling a subsidiary cylinder to an end of a feeder pipe.

Figure 3:
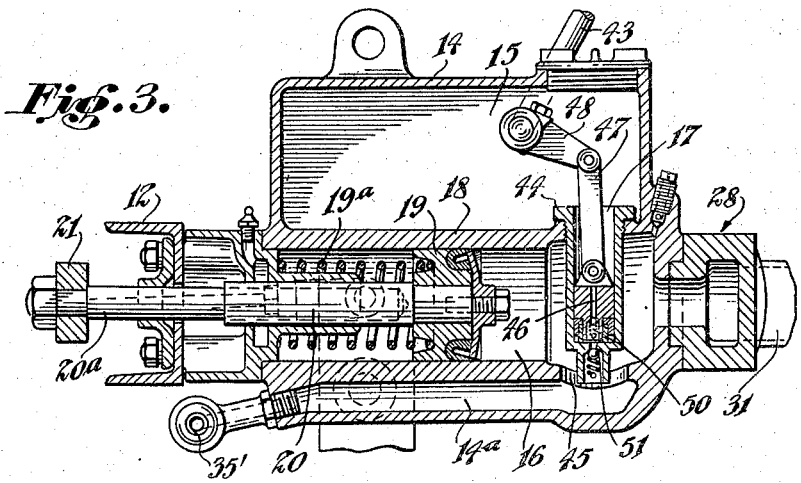
Fig. 3 is an enlarged view in section of the master cylinder and associated mechanism.
Figure 4:
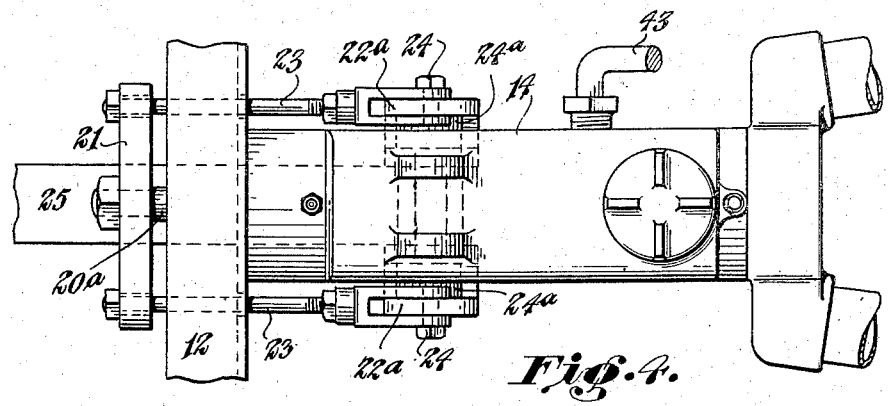
Fig. 4 is a plan view of Fig. 3.

In Figs. 1 and 2 there is illustrated the main frame of a scarifier comprising essentially longitudinal beams 5 secured to evenly spaced transverse beams 6 on which latter are mounted a number of cultivating tools 7 arranged in transverse rows. The cultivating tools comprise tyne arms of the contour illustrated in Fig. 2 and having a terminal share 7a for ground engagement.

Each tyne arm 7 is pivotally mounted intermediate its ends upon a transverse beam 6 by a pair of right angularly arranged straps 8—9, attached at two spaced points to the tyne arm and coaxially mounted at their inner ends upon a transverse axle 10 journalled in a bracket 11 attached to the beam 6 as illustrated in Fig. 2. The pivotal mounting of the tyne arm permits an anti-clockwise angular movement of said tyne arm about the axle 10 to disengage the tyne arm from the ground in performing a stump-jump or obstacle clearing movement.

Centrally located at the front of the implement and effectively supported between the transverse beam 12 of the forecarriage 13 and front transverse beam 6 of the main frame is a rectangular box shaped casing 14, divided into two fluid tight compartments 15—16.

As illustrated in Fig. 2 the upper compartment 15 constitutes an oil reservoir, and communicates through pump 17 in the divisional wall 18 with the lower compartment cylindrically formed to provide a pressure fluid cylinder 16, comprising the above-mentioned master cylinder.

Disposed and operating within the master cylinder 16 is a piston 19 having an outwardly projecting connecting rod 20, which exteriorly of the cylinder, freely extends through a sleeve in the forecarriage beam 12, and in advance of the latter is fitted with a cross head 21.

Disposed adjacently to the casing 14, is a vertical equalizing lever 22 in the form of a yoke comprising complementary straps 22a extending upwardly and outwardly around the side walls of said casing. The upper ends of said straps 22a each pivotally connect one of a pair of draw rods 23 arranged one each side of the casing and parallelly disposed in transverse alignment with the connecting rod 20 of the piston 19. Said rods each connect the opposite ends of the cross head 21.

Lever 22 is pivoted as at 24 to the boss 24a on the underside of casing 14, and at the foot thereof is pivotally connected as at 24b to the inner end of a horizontal draw bar or draft member 25 extending to the tractor.

The inner end wall of the master cylinder 16 has a central port 27 therein communicating with the base of a header (Figs. 1 and 2) which is supported upon the adjacent rear end of the casing 14.

As illustrated in Fig. 1 header 28 has a central cylindrical body 29 with a pair of corresponding branch arms each of which latter connect one of the forward ends of a pair of divergent oil distributor pipes 30—31 extending to the rear transverse beam 6 of the main frame, the rear ends 30a—31a being closed as illustrated in Fig. 1.

The distributor pipes 30—31 are supported upon and secured to the transverse beams 6 by U-bolts 33.

A number of downwardly inclined branch oil pipes 34 are connected to the main distributing pipes 30—31 to supply oil to the transverse feeder pipes 35.

As illustrated in Fig. 5 the branch oil pipe 34 is coupled to the feeder pipes by means of a union 34a within which the ends of pipe 35 are sealed by an arrangement of nuts and gland washers indicated generally at 34b.

The feeder pipes 35 are arranged in and supported by the brackets attached to the transverse angle iron beam 6 of the main frame, as illustrated in Fig. 2. The transverse feeder pipes 35 are formed in interconnected sections 35a spaced by enlarged cylindrical unions 36 (Fig. 6) having formed integral therewith cylinders 37 which are arranged at an upward inclination and disposed in longitudinal alignment with a tyne arm 7. These cylinders 37 comprise the above-mentioned subsidiary cylinders which are of reduced diameter and capacity relatively to the master cylinder 16.

There is an inclined cylinder 37 (Figs. 1 and 2) disposed in longitudinal alignment with each tyne arm 7.

The pipe sections 35a transversely extending from each cylinder union 36 are sealed in the flanged ends 36a of said union by the gland and cup washers indicated at 36b in Fig. 6.

The opposed fixed ends of the pipe sections provide a pivot about which the union and cylinder 37 may describe an angular movement coactive with the movement of the tyne arm 7 to which it is operatively connected, this cylinder movement being effected without breaking the sealing arrangement between said pipe sections and union. As shown in Fig. 7 the outer ends of the pipe sections 35a are similarly sealed in the end of a cylinder union 36c, one end of which is closed as at 36d.

Each cylinder 37 has a piston 38 therein, the rod 39 of which latter projects outwardly from said cylinder with its external end bifurcated as at 38a to pivotally connect the upper end of the tyne arm 7, as indicated at 40, above the pivot axis 10 of said arm as viewed in Fig. 2.

The forward transverse feeder pipe 35′ is fed with oil directly from the oil reservoir in the casing 14, by a passage formed in a central conduit 14a on the underside of said casing. Oil passes from cylinder 16 into the conduit 14a and into the transverse pipe 35′ which is fitted with the subsidiary cylinders and pistons for controlling the pair of forward tyne arms 7 illustrated in Fig. 1.

The oil reservoir 15 of the casing 14 is filled with oil to a predetermined level whereby the master cylinder 16 rearwardly of main piston 19 is filled with pressure oil, and likewise the distributor pipes 30—31 and transverse feeder pipes 35, the oil within the subsidiary cylinders 37 being forwardly of the pistons 38; in this description the terms "forwardly" and "rearwardly" are directional relative to the main frame.

The pump 17 operable by the handle 43, is adapted to charge and maintain the pressure oil within the master cylinder 16, distributor and feeder pipes 30, 31 and 35 and subsidiary cylinders 37.

As illustrated in Fig. 2, the pump 47 comprises a vertical barrel 44 bridging the master cylinder 16 which is formed with an inlet port 45 below and in vertical alignment with the barrel.

An apertured plunger 46 operates within the barrel and is coupled to a connecting rod 47 pivotally engaging a crank 48 mounted upon the spindle 49 journalled in the wall of the casing 14 and having secured thereto the control handle 43.

Coacting pump valves 50—51 control the admission of oil from the reservoir 15 to the main cylinder via inlet port 45 from which the oil flows to the above-described distributor and feeder pipes 30, 31 and 35; as the pump handle 43 is reciprocated the plunger 46 rises and falls in the barrel to alternately open and close the valves 50—51 to thereby charge the master cylinder 16, pipes 30, 31 and 35, and subsidiary cylinders 37, whereby the system is charged with pressure oil prior to the operation of the implement.

The piston rod 20 of the main piston 19 is formed in telescopic sections, the outer 20a of which latter is movable relatively to the inner whilst the implement is being backed.

During the backing operation the master piston 19 remains idle under the influence of spring 19a to thereby prevent a suction effect upon the distributor and feeder pipes 30, 31 and 35, with resultant formation of air locks and loss of pressure upon the oil.

Accordingly the main piston 19 is only moved when a forwardly directed draft pull is exerted by the draw bar or draft member 25. The spring 19a is adapted to maintain a constant pressure, e. g. 95 lbs. per sq. in. throughout the system to thereby maintain the tynes 7 in operative positions and the various sealing glands under pressure, and is particularly useful in maintaining sufficient pressure in the system whilst the implement is travelling down hill to ensure constant ground engagement of the tyne arms.

*Operation*

The lift mechanism of the implement is operated to release and lower the tyne arms 7 into ground engagement. Assuming the master cylinder 16, distributor and feeder pipes 30, 31 and 35 and subsidiary cylinders 37 have been charged with oil, the forwardly directed pull of the draft member 25 causes an angular clockwise movement of the equalizing lever 22.

The cross head 21 is retracted by the draw rods 23 under the movement of lever 22 whereby the piston rod 20 moving in unison with the cross head 21, axially moves the master piston 19 to impart the applied draft pressure into the oil in the master cylinder 18 and the system of pipes and subsidiary cylinders 37 in communication with said master cylinder.

The applied draft pressure on the master cylinder causes a displacement of oil within the master cylinder and thence through the pipes and subsidiary cylinders to exert a pressure upon all the subsidiary pistons 38 which are axially displaced to advance the piston rods 39 outwardly whereby there is imparted a rearwardly directed thrust upon the upper ends of the tyne arms 7, whereby the terminal shares 7a of the latter are maintained at the required depth of ground engagement.

It will be understood that the pressure developed by the forward pull of the draft member 25 is applied to the master piston 19 and by the latter transferred and distributed consequent upon the resultant displacement of pressure oil, through the distributor and feeder pipes 30, 31 and 35 and subsidiary cylinders 37. The pistons 38 in the subsidiary cylinders 37 apply the pressure to the upper ends of all the tyne arms 7, the even pressure developed in the system ensuring uniform depth of ground engagement by all the tyne arms 7.

Figure 8:
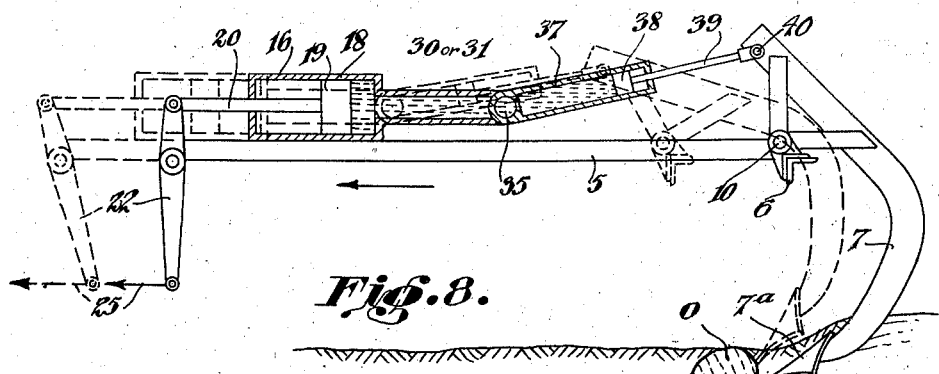
Fig. 8 is a diagrammatic view of a cultivating tool and the stump-jump mechanism illustrating the position assumed during an obstacle clearing movement.

In the event of a tyne arm 7 striking a stump or obstacle, as viewed in Fig. 8, the pivotal mounting of the tyne permits the latter to angularly rise from ground engagement (anti-clockwise about the axis 10) and thereby thrust the piston rod 39 coupled thereto forwardly, causing retractive axial movement of subsidiary piston 38, during which the subsidiary cylinder 37 describes a self adjusting angular movement in unison with the movement of the tyne arm. Retraction of the piston 38 causes a displacement of oil in a forward or return direction, through the particular transverse feed pipe 35, the distributor pipe 30—31 to master cylinder 16 whereby the piston 19 in the latter cylinder 16 is axially moved a distance proportional to the distance moved by the above-mentioned subsidiary piston to absorb or cushion the oil displacement arising from the angular movement or lift of the tyne arm 7. Upon the tyne arm clearing the stump or obstacle it returns by oil pressure controlled movement to ground engagement, thereby eliminating severe strain upon the frame that would otherwise occur upon the tyne arm dropping suddenly and striking the transverse beam 6.

The tyne arm 7 in effecting the stump-jump movement as abovedescribed temporarily overcomes the pressure applied to the upper end thereof, above the pivotal axis 10 of said arm, so that, referring now to Fig. 8, in the position of the tyne arm relative to the obstacle O, the movement on the base is equal to the movement at the top of the pivotal tyne arm, about the axis 10 of the latter. The tyne arm is stabilised and then commences to rise from ground engagement whereby oil is displaced from the subsidiary cylinder 37 to the master cylinder 18. The resultant movement of the piston rod 20 effects an anti-clockwise turning of the equalizing lever 22, thereby causing the velocity of the implement relatively to the ground to increase. Increased velocity of the implement increases the draft and consequently the draft pressure, whereby the pressure is automatically increased upon the remaining tyne arms to retain the latter in ground engagement during the movement of the tyne arm clearing the obstacle O. On the tyne arm regaining ground engagement the pressure of the oil in the system is stabilised, as the master piston 16 returns to the normal position, to impart the normal pressure to said tyne arm and the remainder of the latter in the implement.

In lieu of the pivotal mounting for the subsidiary cylinders as above described any other suitable means may be provided for obtaining unobstructed translation of the axial movement of the piston rods 39 into the angular movement by the tyne arms and vice versa, such as coupling or linkage between the tyne arms and piston rods.

As will be apparent from Fig. 1, the mechanism hereinbefore described provides a substantially simplified construction in comparison with the draft or spring controlled stump-jump mechanism at present employed. The distributor and feeder pipes being disposed in the plane of the main frame, provide not only compactness but also a clearance above and below the frame to facilitate the effective working of the cultivating tools.

There are few interengaging parts to set up wear in the present mechanism, while the essential moving parts of the system, i. e. the pistons, operate in association with the pressure oil and are practically free from wear, moreover the absence of numerous draft connections or the like above or below the main frame provides for expeditious maintenance operations or adjustment of any part of the implement.

The liquid pressure system applies a constant pressure upon all the cultivating tools, with resultant even depth of cultivation, the stump-jump movements of the tools are cushioned against the oil pressure and sudden falling of the tools from a raised position is prevented by the control exercised by the pressure oil, thereby providing a smooth action by the cultivating tools calculated to eliminate strain upon the main frame and supports of said tools.

In the claims of this specification by the term "cultivating tool" is meant an earth working tool pivotally or otherwise mounted for movement relatively to the main frame and ground to describe obstacle clearing movements.

I claim:

1. A stump-jump mechanism for a cultivating tool of an agricultural implement including a draft connection, and a pressure liquid system connecting the cultivating tool and the draft connection to maintain the tool in ground engagement in response to draft upon the draft connection, said pressure liquid system comprising, a pressure liquid cylinder, a piston axially movable in said cylinder by draft pressure, a subsidiary pressure liquid cylinder in sealed liquid flow communication with the first-mentioned cylinder, and a piston disposed within the subsidiary cylinder, externally coupled to the cultivating tool, and axially movable in response to the pressure transmitted by the displacement of pressure liquid under the axial movement of the firstmentioned piston, for the purpose herein specified.

2. Stump-jump mechanism for a cultivating tool of an agricultural implement, consisting of a draft connection, a master pressure liquid cylinder having a piston axially movable by said draft connection, a subsidiary cylinder pipe coupled to the former cylinder, and a piston in the subsidiary cylinder exteriorly connected to the cultivating tool, whereby displacement of fluid by the firstmentioned piston effects an axial movement by the piston in the subsidiary cylinder in a direction to maintain the cultivating tool in ground engagement, whilst the pressure exerted by said cultivating tool upon the piston in the subsidiary cylinder during an obstacle clearing movement is adapted to effect a reverse displacement of fluid towards the master cylinder, for the purpose herein specified.

3. Stump-jump mechanism according to claim 1, and wherein the draft connection comprises a substantially horizontal draw bar or draft member pivotally connected to a vertically disposed lever, the upper end of which latter is operatively connected to the connecting rod of the piston located within the master cylinder.

4. Stump-jump mechanism according to claim 2, and wherein the connecting rod of the piston in said master cylinder is formed in telescopic sections, arranged whereby the draft pressure is only applied to the piston upon a forward movement of the implement, for the purpose herein specified.

5. Stump-jump mechanism according to claim 1 and wherein the piston in said master cylinder is spring influenced to maintain a constant pressure in the pressure liquid system for the purpose herein specified.

6. A stump-jump mechanism according to claim 1 and wherein the subsidiary cylinder is pivotally mounted upon a transverse axis to describe complementary angular movements in unison with the angular movements of the cultivating tool in effecting ground engagement and disengagement.

7. A stump-jump mechanism according to claim 1 and including means for charging the master cylinder and subsidiary cylinder with pressure liquid.

8. A stump-jump mechanism according to claim 2 and wherein said master cylinder is formed in a casing having a separate compartment constituting a liquid reservoir arranged in pressure feed communication with said cylinder to fill the latter with pressure fluid on one side of the piston disposed in said latter cylinder.

9. Stump-jump mechanism for the cultivating tools of an agricultural implement consisting of a draft connection, a master pressure liquid cylinder, a piston within said cylinder and operatively connected to the draft connection, a number of subsidiary cylinders pipe coupled to the master cylinder, and a piston disposed within each subsidiary cylinder and separately connected to a cultivating tool whereby upon the axial movement of the piston in the master cylinder, under the pressure of the draft connection, pressure fluid is displaced within said cylinder to transmit a pressure upon and axially displace the pistons in the subsidiary cylinders, in a direction to normally maintain the cultivating tools in ground engagement, for the purposes herein specified.

10. A stump-jump mechanism according to claim 9 and wherein the master cylinder is pipe coupled to the subsidiary cylinders through a liquid distributor pipe and a number of transverse feeder pipes which latter have included therein a number of liquid-sealed unions each adapted for relative angular movement upon a transverse axis, and formed integral with or attached to a subsidiary cylinder, for the purpose herein specified.

11. A stump-jump mechanism for a tool of an implement consisting of a master pressure fluid cylinder, a piston located in said cylinder with the pressure liquid on one side only of said piston, a connecting rod, a draft connection operatively connected to said rod to axially move said piston on the forward movement of the implement, a subsidiary cylinder pipe coupled to the master cylinder, and angularly movable upon a transverse axis, a piston located in the subsidiary cylinder rearwardly of the pressure liquid therein, and a connecting rod coupling said latter piston with the cultivating tool whereby upon the said axial movement of the piston in the master cylinder, the pressure fluid is displaced in the latter, to transmit the pressure to and thereby axially move, the subsidiary piston in a direction to normally maintain the cultivating tool in ground engagement, without preventing an obstacle clearing movement by the cultivating tool.

12. In an agricultural implement, a frame, a draft device coupled to the frame, a tool mounted on the frame for movement to and from earth-working position, a conduit operatively connecting said draft device and said tool, a fluid cylinder interposed between said draft device and said conduit, and means responsive to draft upon said draft device for displacing fluid from said cylinder through said conduit to said tool to maintain said tool in earth-working position.

13. An agricultural implement comprising a frame, a draft device coupled to the frame, a tool mounted on the frame for movement to and from earth-working position, a fluid cylinder associated with the frame, means for supplying fluid to said cylinder, means operatively connecting said cylinder to said tool, means responsive to draft upon the draft device for displacing fluid under pressure from said cylinder to said tool to maintain said tool in earth-working position, and means actuable under overload to overcome the pressure on said fluid.

14. An agricultural implement comprising a frame, a draft device coupled to the frame, a plurality of tools mounted on the frame for movement to and from operating position, a fluid cylinder associated with the frame, conduits operatively connecting said cylinder with said tools, means for expressing fluid under pressure from said cylinder through said conduits to hold said tools in operating position, said means being releasable under overload upon any one of said tools to overcome the pressure on said tool without diminishing the pressure on the other tools.

ROY CECIL ASH.